United States Patent [19]

VanWinkle

[11] Patent Number: 5,913,686

[45] Date of Patent: Jun. 22, 1999

[54] BREAST-MAPPING

[76] Inventor: Tresa A. VanWinkle, P.O. Box 4249, Alamogordo, N.M. 88310-4919

[21] Appl. No.: 09/042,391

[22] Filed: Mar. 12, 1998

[51] Int. Cl.[6] ............................... G09B 23/28; B43L 1/00
[52] U.S. Cl. ........................... 434/267; 434/262; 434/416
[58] Field of Search .................................... 434/262, 267, 434/269, 415, 416, 421, 428, 430

[56] References Cited

U.S. PATENT DOCUMENTS

| | | | |
|---|---|---|---|
| 4,001,951 | 1/1977 | Fasse ........................................ | 434/267 |
| 4,134,218 | 1/1979 | Adams et al. ........................... | 434/267 |
| 4,655,716 | 4/1987 | Hoevel ..................................... | 434/267 |
| 5,474,064 | 12/1995 | Rohrberg ................................ | 128/630 |

FOREIGN PATENT DOCUMENTS 2241815  11/1991  United Kingdom ................... 434/267

OTHER PUBLICATIONS

Model Breasts for Use in Teaching Breast Self–Examination Journal of Bioengineering vol. 2, No. 5; pp. 427–435; Madden et. al., Aug. 21, 1978.

Progress in Manual Breast Examination; Cancer, vol. 40, No. 1; pp. 364–370; Hall et. al., Jul. 1977.

Lump Detection in Slmulated Human Breasts; Perception and Psychophysics vol. 20, No. 3; pp. 163–167; Adams et. al., 1976.

*Primary Examiner*—Kien T. Nguyen
*Assistant Examiner*—Michael B. Priddy
*Attorney, Agent, or Firm*—Dennis F. Armijo

[57] ABSTRACT

A discretely portable device for facilitating breast self exams which encourages the understanding and records information regarding breasts in three positions, arms at side, arms over head and supine. The information is recorder on transparent material affixed to a mirror. The Breast-Map contains depictions of the normal geography of the breasts and the information recorded on the Breast-Map includes personal information, visual findings, sensory findings, and palpable finding in order to expedite the recognition of change by both women and their health care professionals.

5 Claims, 4 Drawing Sheets

BREAST-MAPPING

BACKGROUND OF THE INVENTION

1. Field of the Invention (Technical Field)

The invention relates to a readily portable Breast Self Exam apparatus which can be attached to a mirror to facilitate both understanding and documentation of the normal breast geography (visual, sensory, and physical) and thus simplify the recognition of abnormal findings discovered by women and/or their health care professionals.

2. Background Art

Breast cancer kills approximately 250,000 women worldwide each year. It is the number one killer of women between the ages of 35 and 50. Mammography, heavily relied upon as a mass screening tool for women 50 and older, has a false negative rate of 25% in women age 40–49 and 40% in women between the ages of 30–39. This is thought to be largely due to the high density of breast tissue in women of this age group along with their higher incidence of "fast growing" breast cancer tumors. This leaves a large deficit in tools for detecting breast cancer in this under 50 age group. "Fast growing" breast cancers can double in size every 3 days. In other words, it can take as little as three months for a single breast cancer cell to double 30 times and produce a 1 cm size tumor. Thus, a breast cancer can grow to 4 cm's (Stage III to Stage IV) in the 9 month period between clinical exams and this is occurring with alarming frequency in the under 50 age group.

Nevertheless according to the World Organization of Family Practitioners, 9 out of 10 breast cancers are discovered by women themselves. Women in the 35–50 age group are not being adequately evaluated for breast cancer when they present with classic signs and symptoms due largely to the fact that only 25% of breast cancers occur in women under the age of 50 and the lack of effective imaging tools for detecting and documenting these fast growing tumors.

Several different breast self exam (BSE) techniques are freely available through nationally recognized agencies. None of these, however, deals directly with the emotional and sensational aspects of performing breast self-exams. For example, although pain and swelling on any part of the body is universally recognized as a significant sign of injury or disease, when these sensations are experienced by a woman in relation to her breasts, she is routinely instructed by her health care professional to ignore these findings as if they are of no importance. This is a verbal cue to a woman to ignore what is occurring in her breasts. Yet, the same health care professional may ask her to perform monthly breast self-exams, and document that she is compliant with the plan of care. Without adequate education related to the breasts, reaction to normal hormonal fluctuations and the resulting cyclic sensations such as pain, swelling, tenderness, etc.; many women are frightened away from performing breast self-exams when they experience these unpleasant sensations, and they are ignored by their health care providers. In addition, the female breast and its underlying structure are complex to evaluate and to describe. For example, a clinical sign of breast cancer may be palpable with a woman in one position and totally concealed when she changes to another position. A woman attempting to perform BSE's, remembers her findings from month to month and communicates information about her normal breast tissue and the abnormalities found is unfairly handicapped. She has been given all the responsibility and none of the tools to do her job effectively. Further more, the amount of information to recall and explain to a health care provider is directly proportional to the amount of breast tissue to be examined, the larger the breast, the more impossible the situation becomes.

In addition, the incidence of breast cancer in younger women is on the rise and the cause remains unknown. What's more, due to the problems identified above, any breast cancers in younger women, while being detected and brought to their health care practitioner's attention are going "undiagnosed" until late stage disease because the early stages are not being adequately documented in the health care professional's office.

It seems only natural that if both women and their health care providers are provided with a simple, concise breast exam tool, educated in basic breast anatomy and physiology, informed of all signs and symptoms of breast cancer, schooled in the benefits of precise documentation of both normal (baseline) breast findings and abnormal breast findings, and instructed on how and when to communicate concerns; communication would improve, early diagnosis would be facilitated and fewer women would be dying of breast cancer.

U.S. Pat. No. 5,207,582, to Michelson is a non-portable, complex, multi-part device designed primarily for in shower or bathroom use. The device and method are designed to locate masses in a single view. The present invention is a portable device intended for use in three different positions including a supine position for not only locating masses, but also for documenting changes in the breast for location, size and other perceived changes in three different views.

U.S. Pat. No. 5,494,442, to Hecht also a non-portable, multi-part, overlay device designed for shower use. Again, this device is designed for locating and documenting changes in masses on overlays and not for other visual and sensation changes perceived by the user. Additionally, this device only documents changes in a single view.

Other prior art systems identified focus only on documenting lumps identified by palpation within the breast, often using shower breast self exams as the source of information. Many medical experts are now in agreement that shower exams are not enough. The Breast-Mapping system is designed to document visual findings, sensations within the breast, and also palpable lumps with different colored markers, in order to document the natural geography of the breast so that change can be more readily identified by both the woman and her health care provider.

None of the prior art, however discloses a simple, economical, portable means to document the natural geography and changes of the breasts including visual and sensational patterns which can be used by both women and their health care professionals.

SUMMARY OF THE INVENTION

In accordance with the present invention, there is provided an apparatus and method for documenting breast self test information. The preferred apparatus comprises a pliable, transparent Breast-Map containing images of breast areas in three different positions, arms at side, arms over head and supine position. Additionally, the Breast-Map has a quick reference guide and a personal history section. The system also comprises a manual for instructing a user of the Breast-Mapping system, colored markers for recording information on the Breast-Map, a health care professionals sheet which has images corresponding to the images on the Breast-Map, and a storage container.

The preferred method comprises a user to review the instruction manual, affix the Breast-Map to a mirror, perform the breast tests as set forth in the manual and record the findings using the colored markers on the Breast-Map. When visiting a health care professional, she can record data from the in-office exam on the health care professional's record which has similar images to the Breast-Map for continuity.

A general object of the present invention is to provide a system which overcomes the obstacles associated with documentation of breast findings by women and their health care professionals. Additionally, the invention encourages continuity in documentation of the findings of breast health exams.

Breast shower exams, while they did provide an easy educational option for the health care provider, are grossly insufficient in evaluating the breasts of well endowed women. Therefore, a general object of this invention is to provide a more effective alternative to simple shower exams which focuses on the needs of the woman and also facilitates the visual and lying down (supine) breast exam not possible in the shower.

A further object of the present invention is to provide an educational system with which health care professionals can teach breast self examination to their clients and thus impress upon these women the importance of their role in the early detection of breast cancer.

Previous inventions found in the art are awkwardly designed to be left up in the shower between uses for all to see. Additionally, these embodiments are not readily, discretely portable. Therefore, to overcome these obstacles to effective breast self examination, another object of this invention is to provide a system which can be easily and discretely used within the home or travel setting, as well as discretely transported to and from the health care professional's office.

An additional object of the present invention is to provide a means for documenting sensations within the breasts including pain, swelling, tenderness, tingling, itching, etc.; findings which have traditionally been overlooked by everyone except the woman experiencing the sensations. Western medicine is generally skeptical of information which is not measurable physically or chemically and this may be a barrier in understanding the earliest signs of breast cancer. Consequently, it is a further objective of this invention to facilitate the expression and documentation of clinically immeasurable sensations such as these in hopes that it will encourage effective breast self exams.

Another object of the present invention is to provide a Breast-Mapping system which is economical enough to be suitable for mass production and distribution through health care and/or health education channels.

A further object of the present invention is to provide an educational system which is written in a simple, friendly, sister-to-sister educational manner suitable for introduction in schools, clinics, hospitals, or home settings.

Another object of the present invention is to provide a system which is effective in teaching women about breast health issues while at the same time updating their health care professional.

A further object of the invention is to provide visual cues for the preferred positions for performing breast self exams.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENT

BEST MODES FOR CARRYING OUT THE INVENTION

The merit of self breast exams in the detection of breast cancer have long been recognized. Women are routinely instructed to perform BSE's without being given the facts to understand the uniqueness of breast tissues and how to properly perform BSE's or the tools to document and communicate the natural geography specific to their breasts and any changes experienced.

Figure 1:
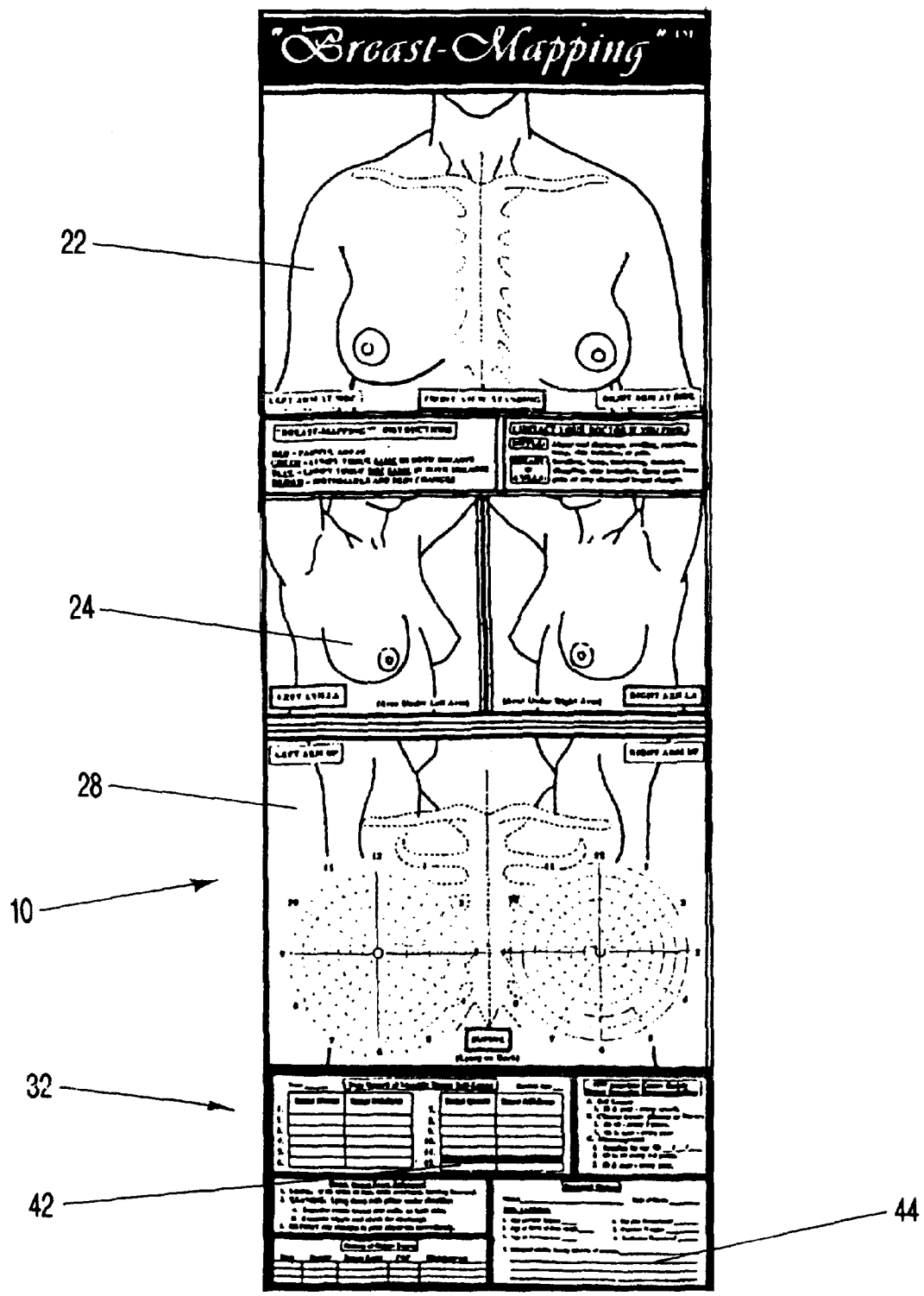
FIG. 1 is a front view of the preferred Breast-Map.
Figure 2A:
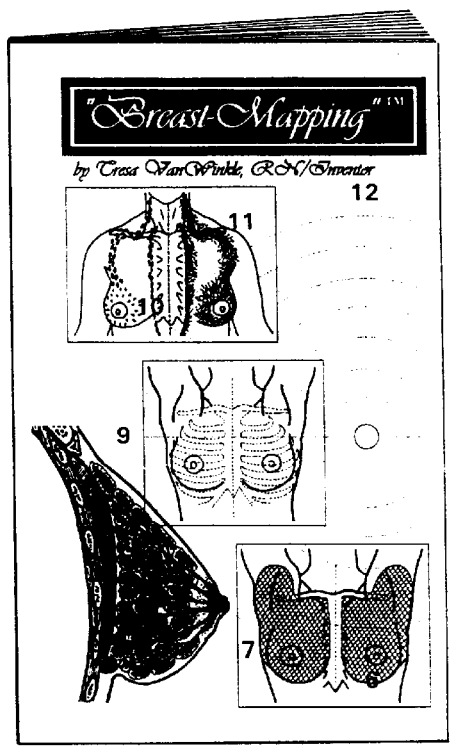
FIG. 2A depicts the written instruction manual.
Figure 2B:
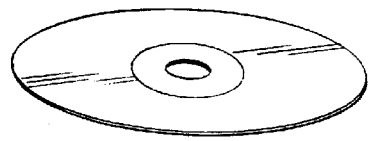
FIG. 2B depicts a compact disc instruction manual.
Figure 2C:
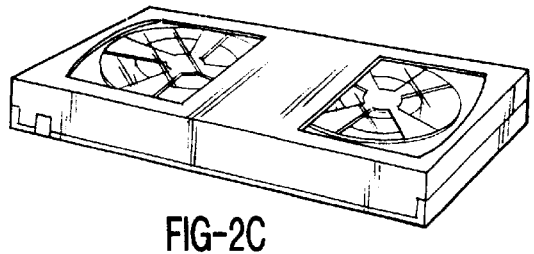
FIG. 2C depicts an audio-visual instruction manual.
Figure 2D:
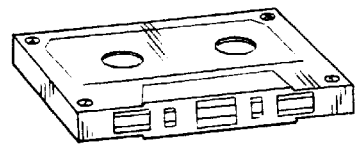
FIG. 2D depicts an audio instruction manual.

The Breast-Mapping system has 5 main parts. They are Breast-Map 10, as shown in FIG. 1, educational/instruction materials, FIGS. 2A, 2B, 2C and 2D, a manual, a compact disc, an audio video tape and a video tape, respectively, colored markers, FIG. 3, health care professional's record FIG. 4, and a container 18 of FIG. 5, which is preferably a mailing tube, or the like.

Breast-Map 10 is preferably constructed of clear vinyl and slides easily under the clips of an x-ray machine in a health care office for viewing (not shown). The Breast-Map 10 has depictions of three different views of each breast, as shown in FIG. 1. First view 22 depicts arms at side, second view 24 shows arms over head and third view 28 depicts a person in a supine position (lying on back). These positions coincide with the three positions recommended for monthly breast self examination by the American Cancer Society and the National Cancer Institute.

Breast-Map 10 also has box 32 designed to record individual information regarding a woman's health care findings and her routine self care. This information can include a record of the menstrual cycle and breast self exams, mammography, PAP smears, and other womens' health and wellness exams. In addition, there could be a section for a client's personal and/or family medical history or even medication and or treatment records. Box 32 with written documentation is preferably located at one end or the other on the Breast-Map so it may be placed under a copy machine in the health care professional's office for a permanent record.

Figure 6:
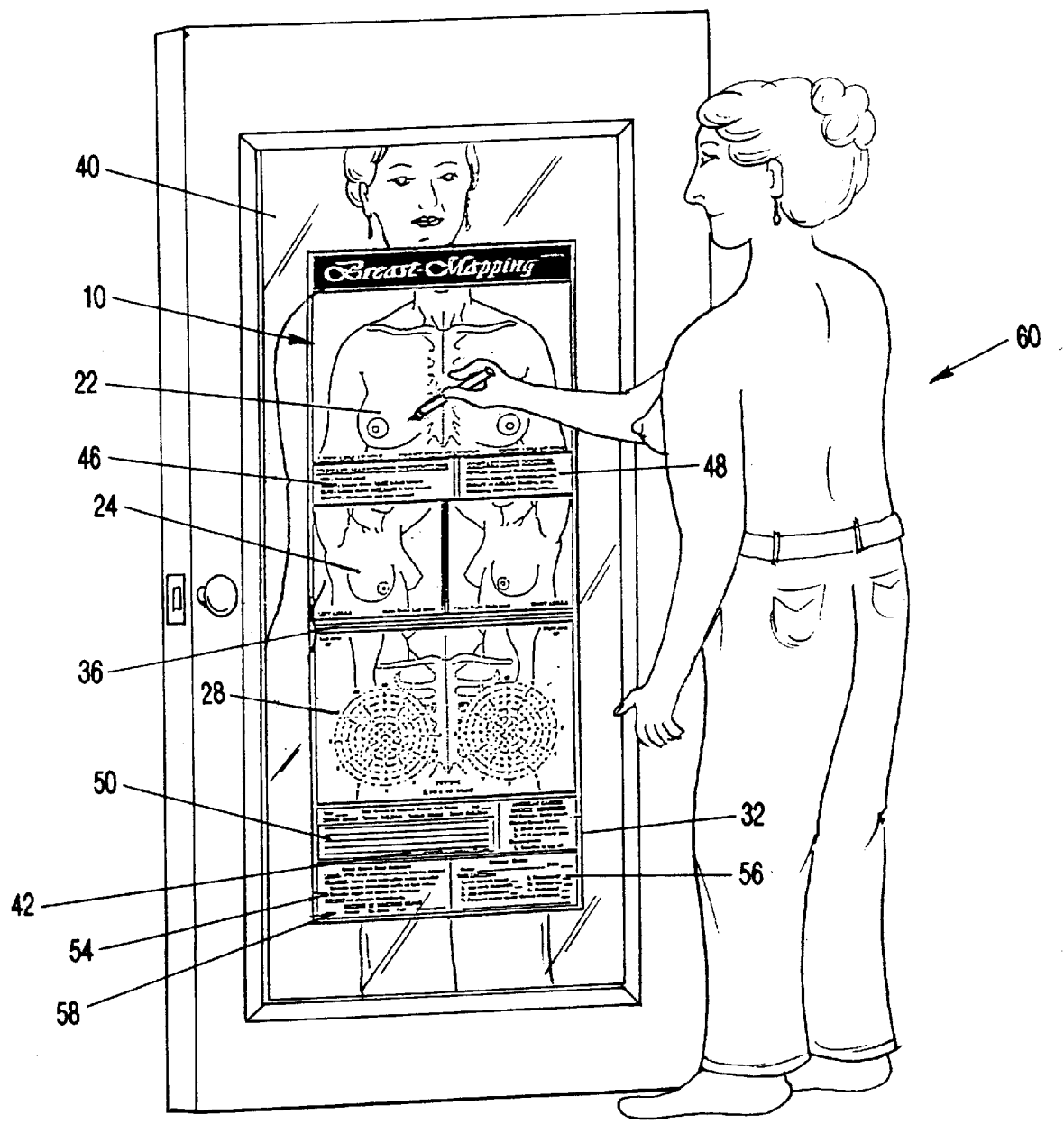
FIG. 6 is a representation of a woman performing her BSE and documenting findings on a Breast-Map which has been affixed to a mirror.

The Breast-Map 10 preferably presses up on the mirror as shown in FIG. 6 with clips, suction cups or other well known affixing devices (not shown), so that exams are done in front of mirror 40 while looking through the Breast-Map 10. This facilitates the visual portion of breast self exams, often overlooked with shower exams. Breast-Map 10 can be cut into sections along guidelines 36 to facilitate use with smaller mirrors.

Educational/instructional materials as depicted in FIGS. 2A, 2B, 2C and 2D contain information regarding the anatomy of breasts along with changes that occur over time. The materials also contain instructions on how to conduct an exam and how to document the results on the Breast-Map 10.

Figure 3:
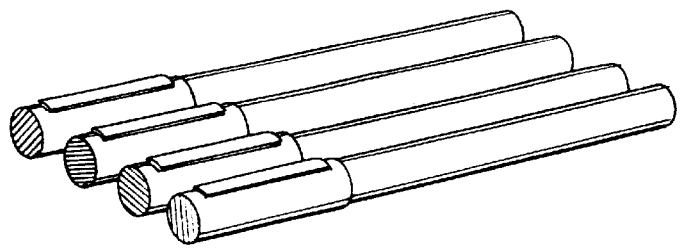
FIG. 3 shows different colored vinyl markers for use on the Breast-Map.

Colored markers as shown in FIG. 3 are preferably washable vinyl markers for documenting results for a self exam on the Breast-Map 10. As an example a user can use the following colors of markers to indicate the following:

Brown for "Visual" landmarks associated with the breasts, i.e., moles, scars, hair, redness, scaliness, dimpling, inverted nipples, flat spots, skin color, orange peel appearance, extra nipples, noting which breast is larger, etc.

Red for "Sensation" landmarks which are experiences by the person within her breast, i.e., sharp/dull/throbbing/ shooting pain, tenderness, burning, swelling, pulling, pins & needles sensation, heat, etc.

Green for "Palpable" landmarks identified by the examining hand during breast self exams which are unusual findings which are the same on both breasts, i.e., lumps, flat spots, nipple inversion, prominent ribs, etc. (Note: for identifying a baseline, documenting the normal geography unique to breasts.)

Blue for "Areas of Concern", any area which falls into the realm of abnormal for the person when compared to the baseline, can be visual, a sensation, or palpable, i.e., any area of change from the norm, nipple discharge, puckering, lump or thickening anywhere in or near the breast and underarm areas, swelling, skin irritation, distortion, (new) retraction of the nipple, scaliness, change in breast size or shape, skin texture or color.

Orange for areas which the health care provider wants to follow or share with another health care provider.

Figures 4, 5:
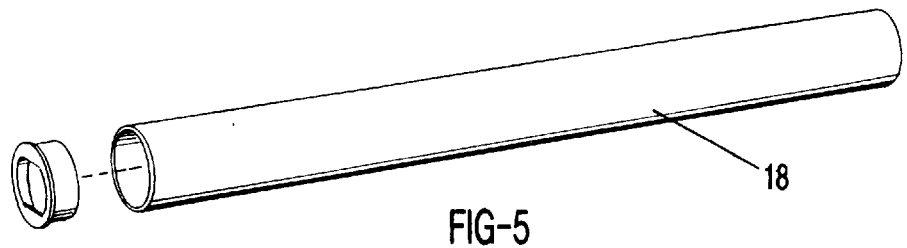
FIG. 4 is the preferred health care professionals record.
FIG. 5 is preferred tube or container for storing and transporting the Breast-Mapping system.

Health care professional's record, FIG. 4 is a visual record of the findings in the clinical breast exam (performed by the health care professional) which will aid in evaluating if change has occurred between visits. At the present time, most "believed to be non-cancerous" breast findings are recorded simply as fibrocystic changes or fibrocystic disease instead of specifically documentation of the breast problem. Breast-Mapping is helping to improve this system to make it more effective and more user friendly for the health care professionals in their time constrained practices. Although only a paper copy is shown, the health care professional's record can be recorded in any type of record media, including paper, video, compact disc, etc. In the ideal scenario, the drawings on the Breast-Map 10 are the same as the drawings on the health care professional's record, FIG. 4 including the use of color to identify visual, sensation, and palpable findings as well as areas of concern; thus, encouraging continuity of information between health care professional and client.

Container 18, in FIG. 5, is used for storage or transport of the Breast-Map 10. The Breast-Mapping system is designed to be overcome the obstacles associated with obtaining adequate health care. By providing a product which is easily rolled into a discreet package to be taken inconspicuously into the office of health care professionals.

To utilize the preferred embodiment, as shown in FIG. 6, Breast-Map 10 is attached to a wall mirror 40 preferably in a bedroom with a bed for the lying down portion of the exam. The visual exam is completed while looking through the Breast-Map 10 into the mirror as shown in FIG. 6. This also facilitates documentation of the appropriate location of findings. To assure continuity of information, the health care professional's documentation sheet, FIG. 4, should contain drawings corresponding to the drawings on the woman's Breast-Map 10. This coordination of information further encourages a higher standard of documentation by health care providers on breast issues.

The client's compliance with the plan of care is self documented on box 32 of the Breast-Map 10, which is designed to fit into an office copier to make a copy for the patient's records and for the health care professional's chart. This feature is an invaluable time saver for the health care professional. After copies are made, the area of the Breast-Map is wiped cleaned and reused for the next year. Additionally, there is a tickler 42 which reminds the woman when to schedule her next womens' health exam, and a personal risk history area 44 to record her personal history as it relates to breast cancer risk, a record area for her mammograms, PAPs, clinical breast exams, as well as any surgical procedures she may have incurred. The entire system can be rolled and placed within container 18, of FIG. 5, and carried inconspicuously into a health care office for evaluation by the health care professional.

Referring now to FIG. 6, drawings of the breasts and underlying structures are depicted with arms at side 22, arms over head 24, and supine or lying down on back 28. Quick reference 46 as to the Breast-Mapping technique is as shown. Reminder area 48 comprises an area which reminds a woman of the findings which require evaluation by a health care professional. Data area 50 represents an area in which to record all BSE dates and reference dates to menstrual cycle, if still occurring. Data area 50 includes a ticker 42 which reminds a woman to schedule her womens' health exams in the $11^{th}$ month. Screening recommendations 52 are also included. Quick breast exam reference 54 is a guide which reminds a woman to look, feel, examine, and report. Woman's personal risk history 56 requires filling in for findings related to breast cancer. Annual record of a woman's health exams 58 includes clinical breast exams, PAPs, mammography, etc. Each of the preceding are positioned on the Breast-Map so they can be easily placed upon a copy machine in the health care professional's office and photocopied to become a part of the client's chart.

INDUSTRIAL APPLICABILITY

The invention is further illustrated by the following non-limiting example.

EXAMPLE 1

It is desirable for a woman to complete breast self exams on a monthly basis. To accomplish this end, the woman first reads, views, or listens to the instructions, FIGS. 2A, 2B, 2C or 2D, on the Breast-Mapping system. Once she understands the basics, she is ready to begin. The Breast-Map 10 is affixed to a mirror 40 in a secure room, as shown in FIG. 6. The woman 58 then disrobes from the waist up and positions herself in front of Breast-Map 10 to begin her exam. To quickly review the procedures, the woman can refer to quick reference 46. First, she looks for and records the visual geography of her breast such as which breast is larger, moles, scars, etc., with the brown marker. This is easily accomplished by looking at her breasts through the Breast-Map 10 in mirror 40 as she completes the exam. Next, she records any sensations she has felt within her breasts such as pain, swelling, tenderness, numbness, tingling, pulling, etc., with a red marker. Third, she accomplishes the manual breast examination, and records the normal geography of her breasts using the green marker. For example, if she finds a lump on one side, she checks the other side to determine if the same structure is present on both sides. If it is present on both sides, it is most likely a part of the normal geography of her breast, i.e., a prominent rib or muscle or possibly the inframammary ridge. Finally, she marks, in blue, areas of concern; an area found in one breast which does not have a match in the other breast. These areas are documented In all three positions (arms at side 20, arms over head 24 and supine position 28). Thereafter, if an area of concern is identified, the health care professional is phoned, and the women goes in for evaluation. This product is designed as a compliment traditional health care, not a system to replace it. After completing her exam, the woman records her findings along with the date of her exam and her last menstrual cycle if applicable in data area 50. Then she removes Breast-Map 10 from the mirror 40 and rolls it up and places it back into its container, FIG. 5, until the next month. When the time comes for her regular womens' health exam, she takes her Breast-Map 10 to her health care appointment.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method of mapping changes in a breast, the method comprising:

a) making a visual examination of a breast and marking visual landmarks on a Breast-Map in a first color;

b) marking the Breast-Map with sensation landmarks of the breast in a second color;

c) palpating the breast and marking palpable landmarks on the Breast-Map in a third color, and d) marking areas of concern on the Breast-Map in a fourth color.

2. The method of claim 1 wherein the steps of marking visual, sensation palpable landmarks and areas of concern comprises the step of marking on three different images on the Breast-Map.

3. The method of claim 2 wherein the step on marking on three different images comprises marking on an arms at side image, marking an arms overhead image and marking a supine position image.

4. The method of claim 1 further comprising providing a doctor a health care provider's chart record comprising images corresponding the images on the Breast-Map.

5. The method of claim 1 further comprising the step of placing the Breast-Map in a portable container.

* * * * *